United States Patent [19]

Kawai

[11] 4,353,101
[45] Oct. 5, 1982

[54] VIDEO TAPE RECORDER

[75] Inventor: Tsutomu Kawai, Yokosuka, Japan

[73] Assignees: Funai Electric Co., Ltd., Osaka; Efuti Giken Co., Ltd., Yokohama, both of Japan

[21] Appl. No.: 147,831

[22] Filed: May 8, 1980

[51] Int. Cl.³ .................... G11B 15/66; G11B 23/04
[52] U.S. Cl. .......................................... 360/85; 360/95
[58] Field of Search ............... 360/85, 95, 130.22, 360/130.23, 93, 96.1

[56] References Cited

U.S. PATENT DOCUMENTS

| | | | |
|---|---|---|---|
| 3,833,921 | 9/1974 | Kihara | 360/95 |
| 3,864,742 | 2/1975 | Katoh | 360/95 |
| 4,012,793 | 3/1977 | Blanding | 360/95 |
| 4,056,833 | 11/1977 | Schulz | 360/85 |
| 4,060,840 | 11/1977 | Umeda | 360/130.23 |
| 4,074,329 | 2/1978 | Sakumoto et al. | 360/95 |
| 4,092,684 | 5/1978 | Umeda | 360/85 |
| 4,092,686 | 5/1978 | Schulz | 360/85 |
| 4,138,699 | 2/1979 | Ura et al. | 360/95 |

Primary Examiner—Alfred H. Eddleman
Attorney, Agent, or Firm—Fisher, Christen & Sabol

[57] ABSTRACT

A video tape cassette device of the type wherein the tape is stored in a cassette containing a supply spool and a take-up spool. The spools lie side-by-side on parallel axes, and the rotary video transducing head rotates about an axis parallel with the axes of the spools in the cassette.

22 Claims, 26 Drawing Figures

VIDEO TAPE RECORDER

DETAILED DESCRIPTION OF THE INVENTION

This invention relates to improvements in a portable video tape recorder. An object of the invention is to provide a portable video tape recorder easy to design and compact to carry.

Lately, this kind of tape recorder is often of the tape that a video tape wound onto a pair of tape reels is drawn out of a cassette toward a rotary head and capstan through a tape-out pin or roll for loading. Various kinds of mechanisms necessary for the rotary head occupying a wide space on a deck and for loading the tape onto the head, have been proposed. However, it is desirable to provide the portable video tape recorder constructed to be further simple and compact. This invention has been designed to overcome the aforesaid problem.

Figure 1:
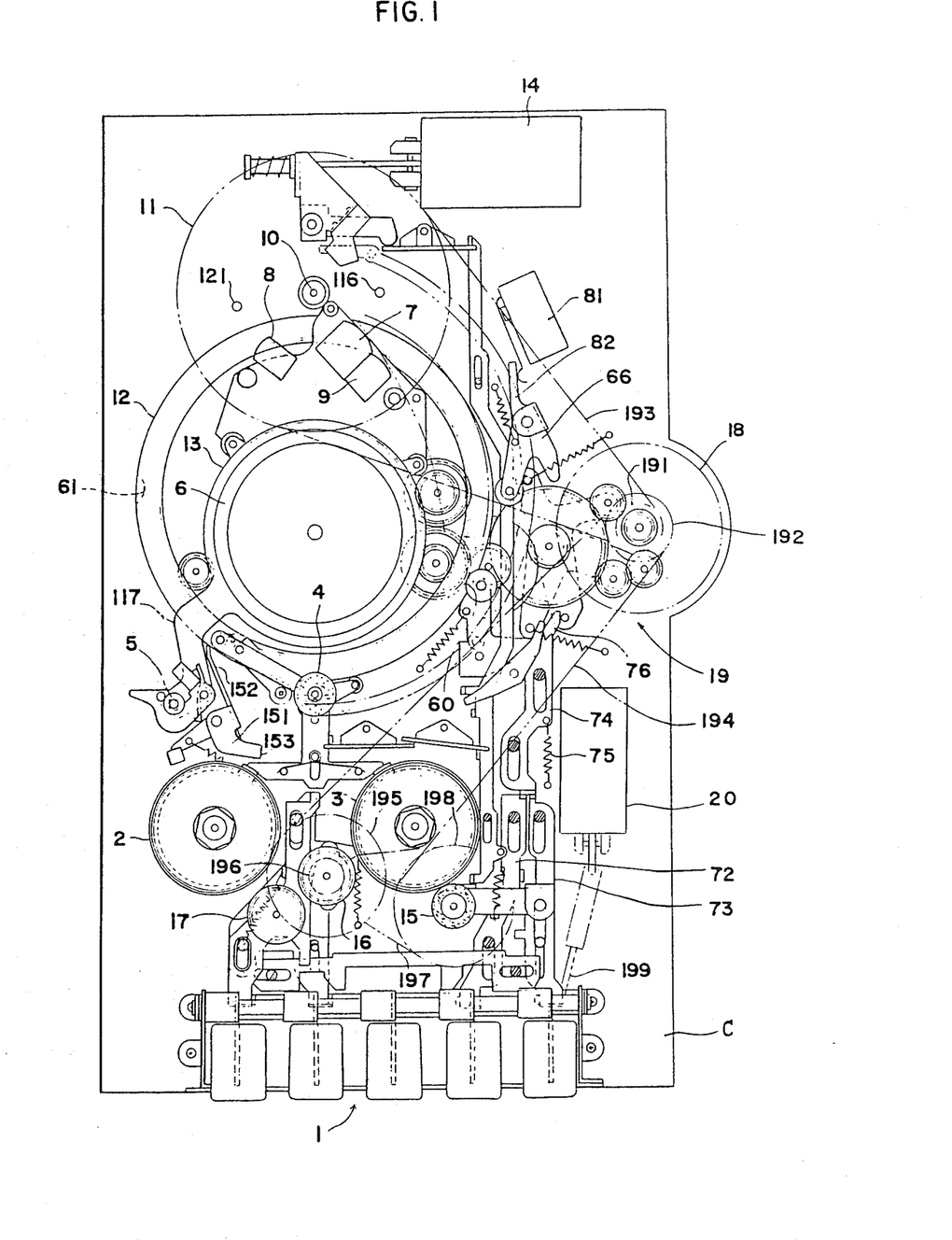
FIG. 1 is a plan view of the operating mechanism of a preferred form of video tape recorder according to the invention, before a tape has been withdrawn from a cassette.

Next, an embodiment of the invention will be detailed in accordance with the drawings. FIG. 1 shows the whole mechanism not in operation, in which 1 is a group of control buttons, 2 is a feeder reel, 3 is a take-up reel, 4 is a pinch roller, 5 is a tape take-out pin, 6 is a rotary head, 7 is a voice control head, 8 is a whole width erasing head, 9 is a voice erasing head, 10 is a capstan, 11 is a flywheel, 12 is a first loading gear ring pivotally supporting the pinch roller 4, 13 is a second loading gear ring provided with the tape take-out pin 5, 14 is a plunger to press-contact the pinch roller 4 with the capstan 10, 15 is an idler for driving the take-up reel 3, 16 is a rapid feed transmission gear, 17 is a return transmission gear, 18 is a motor, 19 is a gear train for transmitting rotation of motor 18 to the first loading gear ring 12 and second loading gear ring 13, and 20 is a automatic stopping plunger. Detailed construction and relative function of each of the above will be described as follows.

Figure 2:
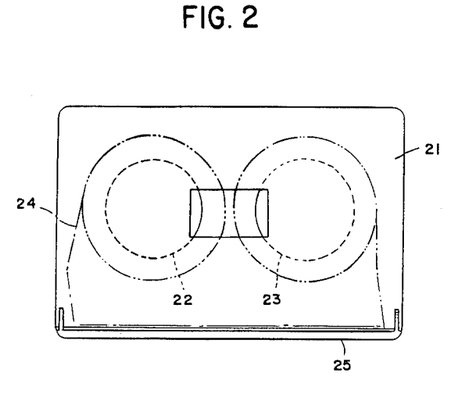
FIG. 2 is a plan view of a cassette for use with the recorder.
Figure 3:
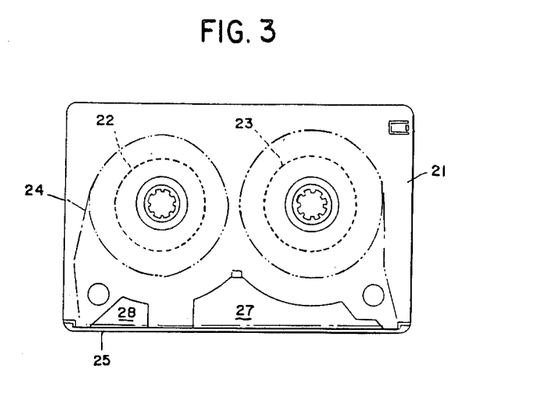
FIGS. 3 and 4 are respective bottom and end views of the cassette.
Figure 4:
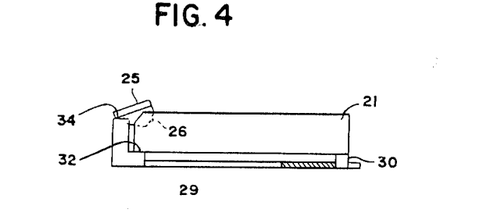
Figure 5:
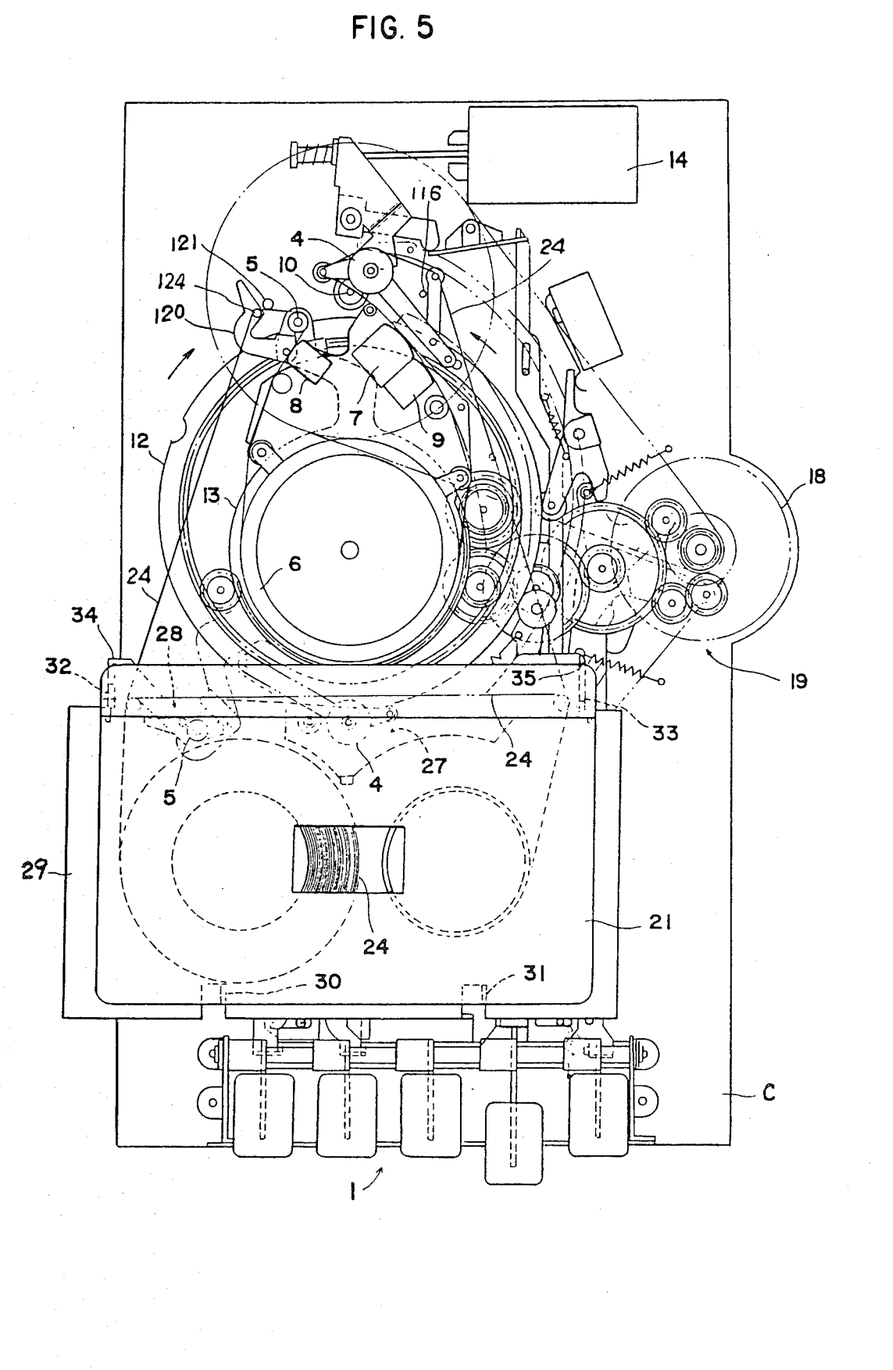
FIG. 5 is a plan view similar to FIG. 1 but with a cassette in place and the tape withdrawn to its operating position.

A cassette 21 for video tape used in this embodiment is the smallest at present and is about 106 mm wide, 68 mm long, and 12 mm thick. A magnetic video tape 24 wound onto a pair of tape reels 22, 23 are housed within the cassette 21 as shown in a plan view of FIG. 2, a bottom view of FIG. 3, and a side view of FIG. 4. The cassette 21 has at its tape take-out face of the front edge an opening-and-closing lid 25 pivoted 26 thereto, the lid 25 being closed tight normally by a spring or the like. The cassette 21 also, as shown in FIGS. 3 and 5, is provided at the front bottom with a recess 27 accommodating therein the pinch roller 4 and a recess 28 accommodating the tape take-out pin 5. FIG. 4 shows the cassette 4 set on a cassette mount base 29 located above the reels 2, 3. The cassette base 29, as shown in FIG. 5, has cassette level keeping pieces 30, 31, 32 and 33, the pieces 32, 33 forming abutments 34, 35 for the lid 25. When the cassette 21 is set on the base 29 as shown in FIGS. 4 and 5, the lid 25 abuts at its foremost end against abutments 34, 35, thereby being kept open at the front. At this time, the pinch roller 4 pivoted to the first loading gear ring 12 and the tape take-out pin 5 formed at the second loading gear ring 13 are positioned within the recesses 27, 28. In order to pull-out the tape 24 shown by the solid line in FIG. 5 and keep it in loading condition (video recording or playback condition), the pinch roller 4 and take-out pin 5, as shown by the phantom line, are positioned at the rear of tape 24 within the recesses 27, 28 respectively. Then, the first and second loading gear rings 12 and 13 are rotated in the opposite directions to move the pinch roller 4 and take-out pin 5 in the loading direction, thereby drawing out the tape 24. Hence, the tape 24 applies loading to electric elements, such as rotary head 6, voice control 7, whole width erasing head 8, and voice erasing head 9, and further press-contacts with the capstan 10 through the pinch roller 4, whereby feed rotation of capstan 10 by the motor 18 and winding-up of the take-up reel 3 through idle roller 15 carry out tape drive for video recording and playback.

Rotations of the first and second loading gear rings 12 and 13 necessary for the above loading of tape 24 are carried out by the gear train 19 connected properly to the motor 18.

Figure 6:
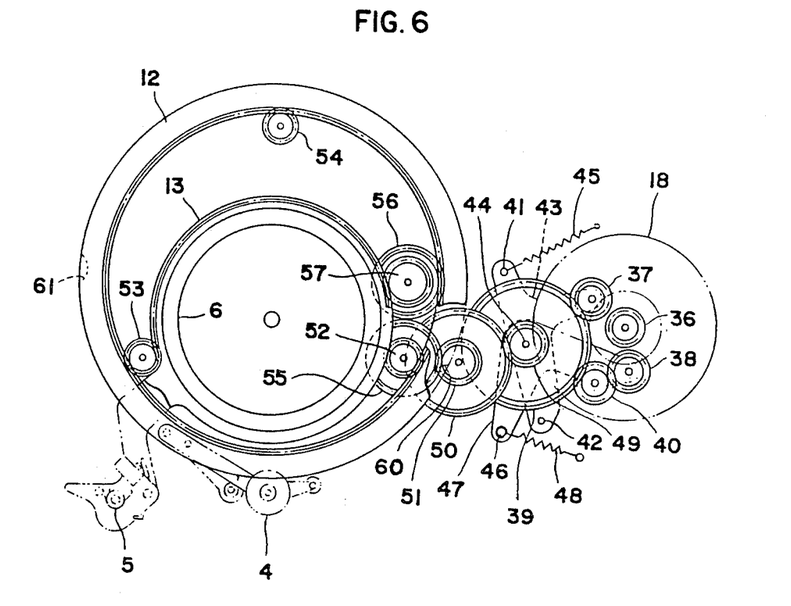
FIG. 6 is a fragmentary plan view of the gear train connecting the motor with the tape loading and unloading mechanism.

In detail, a basic gear 36, as shown in FIG. 6, is provided at the rotary shaft of motor 18 and connected to two gears 37, 38 in relation of being properly switched thereto, the gears 37, 38 being in neutral position. One gear 37 is rotatable in forward direction and connected to a larger gear 39, and the other gear 38 for reversing is connected to the larger gear 39 through an intermediate gear 40. Also, the gear 37 is pivoted to a swingable plate 43 of T-shape and having pins 41, 42 at both opposite ends thereof, the plate 43 being pivoted at an intermediate portion between the both ends to a shaft 44 of larger gear 39, the pin 41 being biased by a spring 45 in the direction of connecting the gear 37 with the basic gear 36. The gear 38 is pivoted to one end of a rocking plate 47 of L-shape and having at the other end a pin 46, the plate 47 being pivoted at its intermedaite portion to the shaft 44 of larger gear 39 to thereby bias the pin 46 by a spring 48 in the direction of connecting the gear 38 with the basic gear 36. Thus, the two rocking plates 43, 47 are switched to transmit the forward and reverse rotations to the larger gear 39. The larger gear 39 is integral with a pinion 49 whose rotation is transmitted to a speed change gear 50 and a pinion 51 integral therewith.

Figure 7:
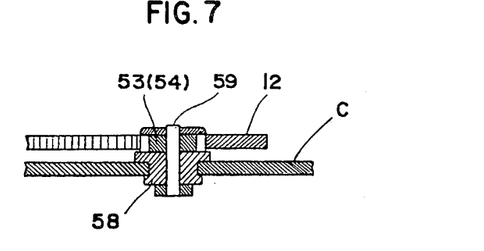
FIG. 7 is a fragmentary view of a portion of the gear train.
Figure 8:
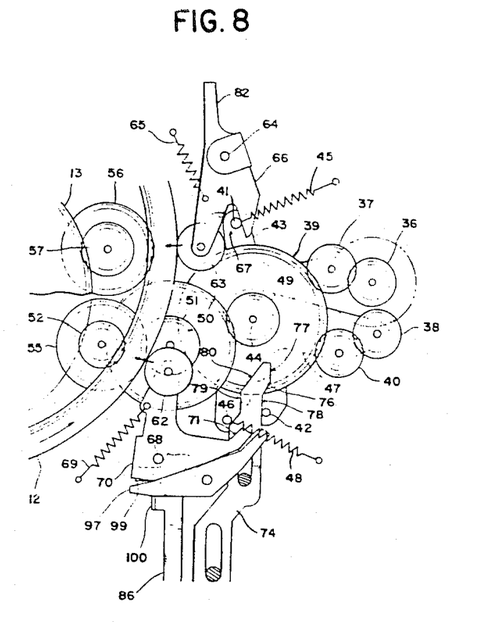
FIG. 8 is a more detailed plan view of the relative positions of the gears and their controls during withdrawal of tape from the cassette.

On the other hand, the first loading gear ring 12 has at its inner periphery a geared groove and is supported radially by support pinions 52, 53 and 54 in mesh with the geared groove. One support pinion 52 is integral with a gear 55 in mesh with the pinion 51 driven by the motor 18 through the gear 37 or 38, whereby forward or reverse rotation of motor 18 is transmitted to the first loading gear ring 12. Upon rotation of first loading gear ring 12, another connecting gear 56 in mesh with the inner geared groove at the ring 12 is rotated. Then, reverse rotation of first loading gear ring 13 is transmitted through a pinion 57 integral with the gear 56 to the second loading gear ring 13 provided rotatably onto the outer periphery of rotary head 6. Hence, the pinion 37 is switched to rotate the first and second loading gear rings 12 and 13 in the opposite direction as shown by the arrows, thereby driving the pinch roller 4 and take-out pin 5 out of the recesses 27, 28 following the rotations of rings 12, 13, thus drawing the tape 24 out of the cassette 21 toward the opposite peripheral sides of rotary head 6. The pinch roller 4 press-contacts the tape 24 with the capstan 10 by means of the plunger 14 turned-on by a mechanism to be hereinafter described, at which time the tape 24 is put onto the pinch roller 4 side from the taken-out side by pin 5 successively through the whole width erasing head 8, rotary head 6, voice erasing head 9, voice control head 7, and capstan 10. In addition, the support gears 53, 54, which support the first loading gear ring 12 at the inner periphery thereof, are, as shown in FIG. 7, fixed to gear shafts 59 rotatably supported to a press-fit member 58 fixed to a chassis C respectively.

Figure 9:
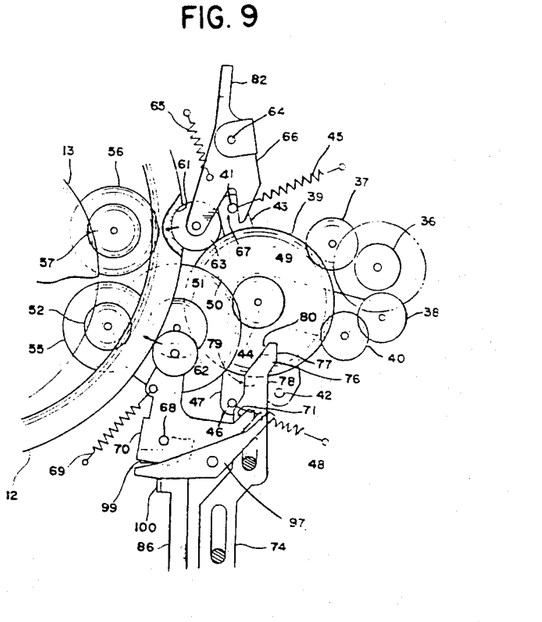
FIG. 9 shows the condition when loading has been completed.

A mechanism for a cessation of rotation at a finish of loading or unloading by the first and second loading gear rings, comprises semicircular recesses 60, 61 of different depths and provided at the outer periphery of ring 12, and two rollers 62, 63 insertable into the recesses 60, 61 respectively as shown in FIGS. 8 through 11. A cessation when loading is finished, as shown in FIG. 9, is carried out by the roller 63 fitting into the recess 61. In detail, the roller 63 is mounted rotatably on one end of a rocking plate 66 which is pivoted to a spindle 64 and biased by a spring 65 to always press-contact the roller 63 with the outer periphery of ring 12, the rocking plate 66 being angled to approach the ring 12 in the loading direction and to escape from the ring 12 in the unloading direction. A V-shaped recess 67 is formed at the rocking plate 66, which engages with the pin 41 at one end of T-shaped rocking plate 43 provided at the normal rotation gear 37. When the roller 63 is fit into the recess 61 from the outer periphery of ring 12 in the loading condition shown in FIG. 8, the rocking plate 66 swings in the direction of the arrow in FIG. 9 and moves the pin 41 at rocking plate 43 through one side of V-shaped recess 67 against the spring 45 to thereby swing the rocking plate 43 around the shaft 44, thus disengaging the gear 37 from the basic gear 36. Hence, the ring 12, which is rotated in forward direction through the gear 37, stops its rotation in the loading direction.

Figure 10:
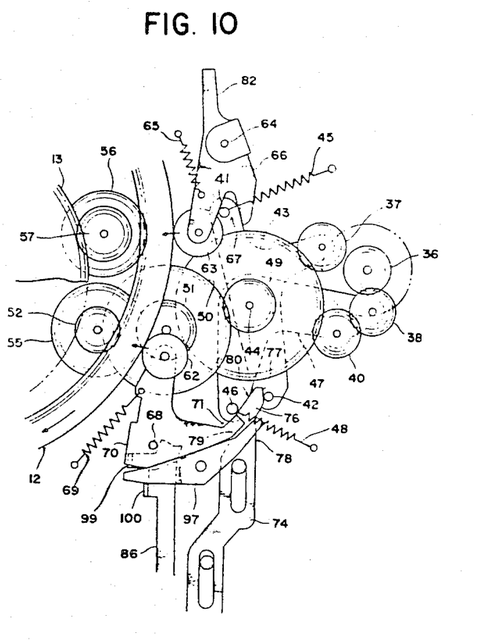
FIG. 10 shows the condition during unloading of tape to return it to the cassette.

The ring 12, when the unloading is finished, stops its rotation by the roller 62 fitting into the recess 60. In detail, the roller 62 is provided rotatably at one end of a rocking plate 70 which is pivoted to a shaft 68 and biased by a spring 69 to always press-contact the roller 62 with the outer periphery of ring 12, the rocking plate 70 being angled to move the roller 62 toward the ring 12 with respect to the unloading direction and to escape from the ring 12 in the loading direction. Also, the rocking plate 70 has at its other end a hook 71 which corresponds to the pin 46 at L-shaped rocking plate 47 provided at the reverse gear 38. When the roller 62 in unloading condition shown in FIG. 10, is fitting into the recess 60 from the outer periphery of ring 12, the rocking plate 70 turns in the direction of the arrow in FIG. 11 to pull the pin 46 at rocking plate 47 to thereby turn the rocking plate 47 around the shaft 44, thus disengaging the gear 38 from the basis gear 36. Consequently, the ring 12 reversely rotated through the gear 38 stops its rotation in the unloading direction. The recess 60 is so positioned that when the pinch roller 4 and take-out pin 5 in association relative therewith are positioned within the cavities 27, 28 at the cassette 21, the roller 62 is fitting into the recess 60. The recess 61 is so positioned that when the pinch roller 4 and take-out pin 5 turn to reach the loading finish positions respectively, the roller 63 is fitting into the recess 61.

Figure 11:
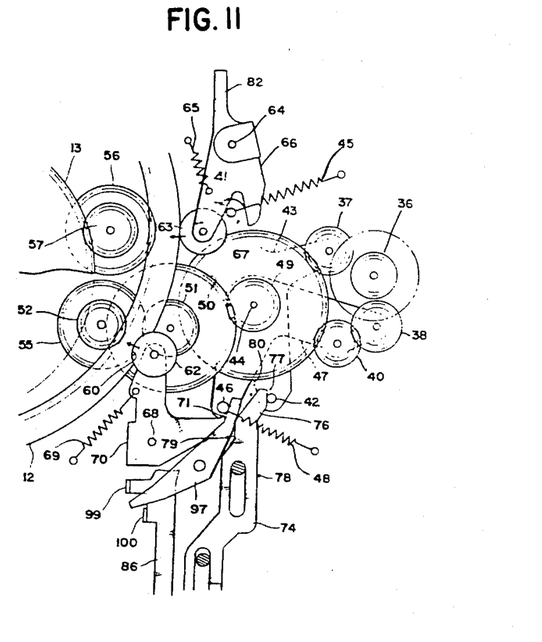
FIG. 11 shows the condition when unloading is completed.

Furthermore, the normal rotation gear 37 and reverse rotation gear 38 are mutually switched by a playback button (PLAY) and video recording button (REC) in a group 1 of operating buttons of self-locking type to be hereinafter described. The button (PLAY) or (REC) is operated to move a common slide plate 74 through slide plates 72, 73, the slide plate 74 being pulled by a spring 75 against the operating direction and having at the tip a cam 76 as seen in FIG. 1. The cam 76, as shown in FIG. 11, has horizontally displaced cam faces 77, 78, the cam faces 77, 78 abutting against the pin 42 at the T-shaped rocking plate 43 at forward rotation gear 37. When the cam face 77 restricts the pin 42 against the spring 45, in other words, in condition of not operating the buttons 72, 73, the gear 37 disengages from the basic gear 36 to transmit no rotation to the rings 12, 13. However, when the button 72 or 73 is operated, the common slide plate 74 moves to abut the cam face 78 against the pin 42, whereby the T-shaped rocking plate 43 slightly turns through the spring 45 and the forward rotation gear 37 meshes with the basic gear 36. Hence, the motor 18 rotates both the rings 12, 13 through the transmission gear train to move the pinch roller 4 and take-out pin 5 in the loading direction.

Figure 12:
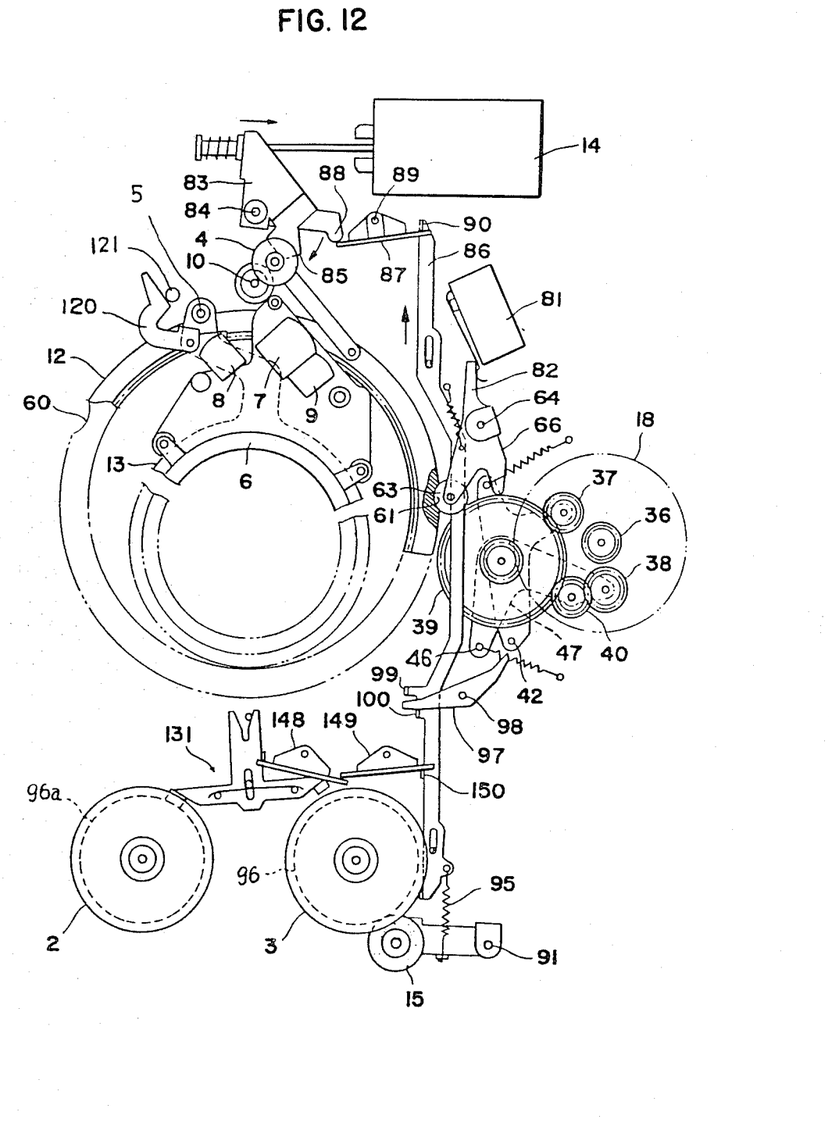
FIG. 12 is a fragmentary plan view of the mechanisms which engage the pinch roll with the capstan.

At the other edge of common slide plate 74 are formed stepped cam faces 79, 80, which abut against the pin 46 at L-shaped rocking plate 47 carrying the reverse rotation gear 38. When the cam face 79 restricts the pin 46 against the spring 48, in other words, in condition of operating the button (PLAY) or (REC), the gear 38 disengages from the basic gear 36. When the stop button (STOP) is operated or automatic stopping mechanism acts, in condition of loading as shown in FIG. 12, the playback button (PLAY) or video recording button (REC) is released through the self-locking mechanism in control button group 1, and simultaneously the common slide plate 74 returns through the spring 75. Then, the pin 46 at L-shaped rocking plate 47 moves from the cam face 79 to the cam face 80 and abuts thereagainst and the plate 47 slightly turns through the spring 48 to mesh the reverse rotation gear 38 with the basic gear 36, thereby transmitting reverse rotation to the rings 12, 13 to be in the unloading condition. In addition, when the unloading is finished to fit the roller 62 into the recess 60 as foregoing, the pin 46 at the L-shaped plate 47, even when abutting against the cam face 80, is restricted by the hook 71 at rocking plate 70, whereby the reverse rotation gear 38 is not engaged with the basic gear 36, thus transmitting no rotation to the rings 12, 13.

Upon operation of playback button (PLAY) or video recording button (REC), the forward rotation gear 37 engages with the basic gear 36 through the cam face 76 at common slide plate 74 and associates with the rings 12, 13 to be in loading condition. Next, when the loading is finished and the pinch roller 4 and take-out pin 5 move together with the tape 24 so as to reach the fixed position as shown in FIG. 12, the roller 63, as shown in FIG. 9, is fit into the recess 61 at ring 12 to move the forward rotation gear 37 away from the basic gear 36 to thereby stop the loading. At the rocking plate 66 carrying the roller 63 is provided an actuator 82 for turning-on a switch 81 to actuate the plunger 14, so that the plunger is acutated upon stop of loading. At the utmost end of plunger 14 is provided a pusher 83 turnable around its spindle 84, the pusher 83 urging the pinch roller 4 against the capstan 10 through a contact surface 85 and being connected in association with an elongate slide plate 86 through a connector 87, the slide plate 86 engaging or disengaging the idler 15 with or from the take-up reel 3 in order to transmit thereto rotation for playback or video recording. The loading starts from condition in FIG. 1 and the plunger is actuated as shown in FIG. 12, then the contact surface 85 pushes the pinch roller 4 spindle, thereby press-contacting roller 4 with the capstan 10 to convey the tape 4 sandwiching it therebetween.

A tongue 88 is provided at the pusher 83 and abuts against one end of connector 87. The connector 87 swings around its spindle 89 and connects at the other end with one upturned 90 at the elongate slide plate 86 and associates therewith. The idler 15 is provided at an arm 92 swingable around a spindle 91, the arm 92 being opposite at its edge 93 to the other upturned 94 of slide plate 86 through a spring 95. Hence, when the plunger 14 is turned-on, the idler 15 abuts against a smaller diameter portion 96 integral with the lower portion of take-up reel 3, following the movement of slide plate 86 in the direction of the arrow, thereby transmitting rotation in the take-up direction to the reel 3 through a drive mechanism to be hereinafter described.

Figure 13:
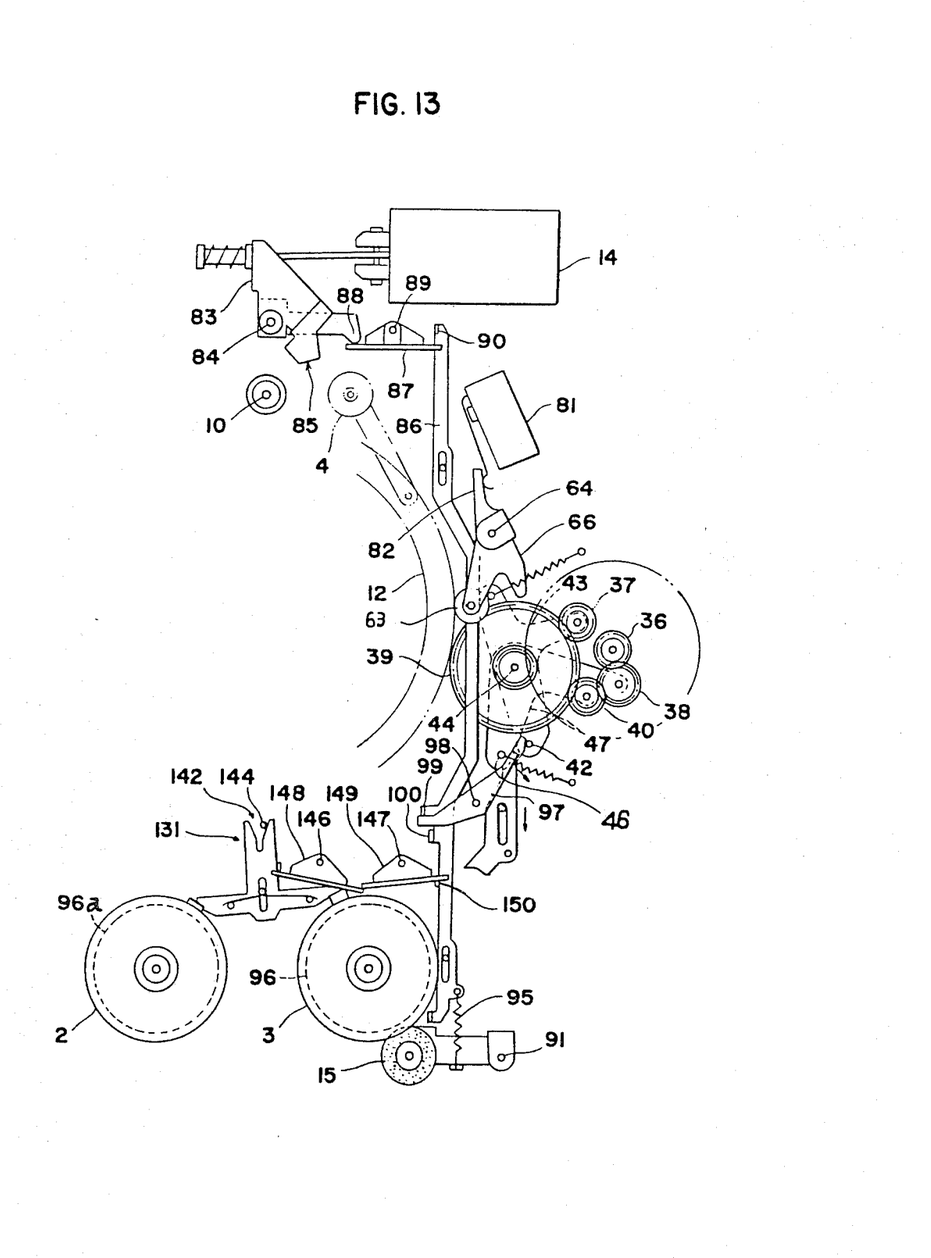
FIG. 13 shows the positions after disengagement of the pinch roll.

Next, when the playing back or video recording is finished and the stop button (STOP) is operated, the plunger is turned-off to release the pinch roller 4 from press-contact with the capstan 10. The pin 42 at the T-shaped rocking plate 43 carrying the forward rotation gear 37 which disengages from the basic gear 36 through the roller 63 fitting into the recess 61, is abutting against the cam face 77 at the common slide plate 74 which returns by the stop button (STOP), thereby keeping the gear 37 in disengagement from the basic gear 36. Simultaneously, the pin 46 at L-shaped rocking plate 47 carrying the reverse rotation gear 38 abuts against the cam face 80 at the common slide plate 74, because the roller 62 is positioned on the outer periphery of ring 12 (being not fitting into the recess 60) and the hook 71 at the rocking plate 70 is released from the pin 46. At this time, the reverse rotation 38 meshes with the basic gear 36 to put the ring 12 in unloading condition. However, even when the plunger 14 is turned-off to put the ring in unloading condition, the loading tape 24 must be wound-up within the cassette 21. Hence, the elongate slide plate 86, as shown in FIG. 13, is provided with a rocking plate 97 which restrains the plate 86 from its return even when the plunger 14 is turned-off, and which keeps the idler 15 in condition of press-contacting with the smaller diameter portion 96 at take-up reel 3. The rocking plate 97 is pivoted at its intermediate portion onto a spindle 98, is inserted at one end between two upturned lug 99, 100 formed at the elongate slide plate 86, and abuts at the other end against the pin 42 at L-shaped rocking plate 47. In the unloading condition of meshing the reverse rotation gear 38 with the basic gear 36 as foregoing, the pin 46 at rocking plate 47 urges the other end of rocking plate 97 to turn the plate 97 around the spindle 98 and the other end of plate 97 checks through the lug 99 the slide plate 86 which tends to return by turn-off of plunger 14. As a result, even during the unloading, the idler 15 abuts against the smaller diameter portion 96 so as to allow the take-up reel 3 to wind up the tape 4.

Figure 14:
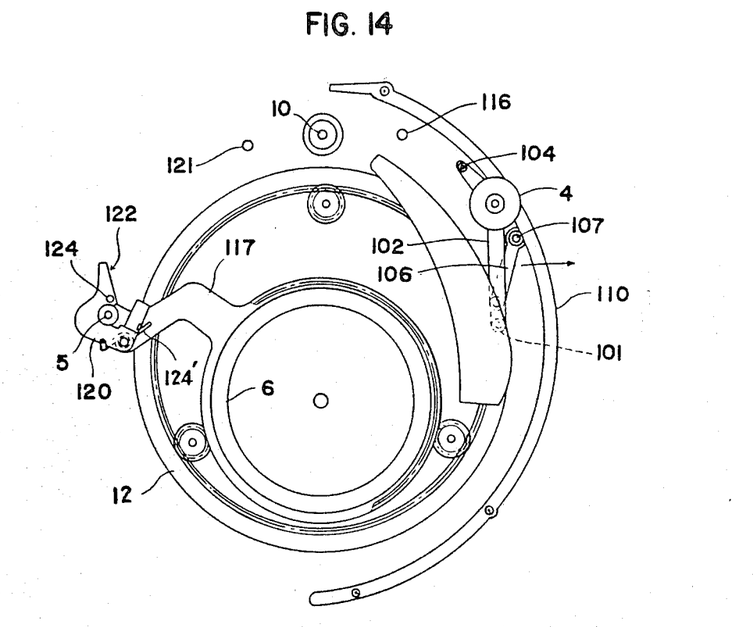
FIGS. 14 and 15 are respective plan, and side views of the guides for movement of the pinch roll during loading and unloading.
Figure 15:
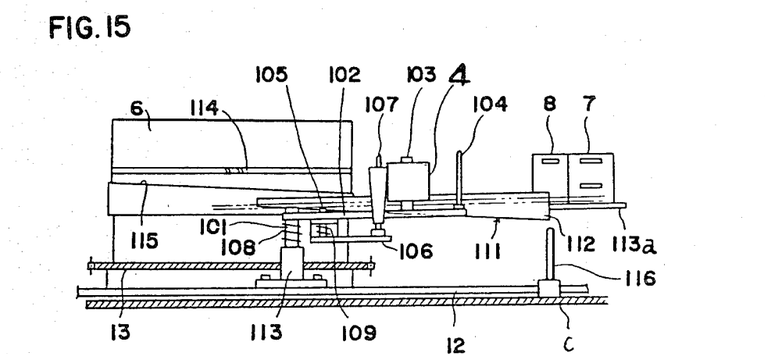

Furthermore, a mechanism for placing the tape 24 by means of the rings 12, 13 will be detailed. The pinch roller 4, as shown in FIGS. 14 and 15, is pivoted onto a spindle 103 at one end of arm 102 pivoted at its other end through a spindle 101 to a cylinder 113 fixed to the ring 12. A pin 104 is provided at the foremost end of arm 102. A small arm 106 is pivoted at its one end to an intermediate portion of arm 102 through a spindle 105 and has at the other end a tapered roller 107. The arm 102 fixedly supports a spindle 101 which is mounted vertically movably to the cylinder 113 through a spring 108 and supports the pinch roller 4 to escape radially outwardly (in the arrow direction) from the ring 12. The tapered roller 107 similarly is formed to escape radially outwardly of the ring 12 through a spring 9. Also, a loading guide 110 properly fixed to the chassis C is provided in the loading rack of pinch roller 4, so that the pinch roller 4 and tapered roller 107, which are biased radially outwardly of ring 12 through the springs 108, 109 in the escaping direction, abut against the guide roller 110 and are guided therewith from the starting point of loading to the terminus thereof. In the loading track of pinch roller 4, a guide plate 112 having a tapered surface 111 abutting against the upper portion of spindle 101 for fixing the arm 102, is fixed to a head base 113a carrying heads 7, 8 and 9. The tape 24, which is pulled out by pinch roller 4 simultaneously with the loading, is placed on and along a tape guide groove 115 which is slanted corresponding to a head gap 114 at the cylinder portion of rotary head 6. At this time, the upper end of spindle 101 is guided along the tapered lower surface of guide plate 112 corresponding to the guide groove 115, pinch roller 4 carrying the tape 24 moves downward against the spring 108 between the arm 102 and the cylinder 113, and the tape 24 is placed slantwise on the tape guide groove 115 at rotary head 6 from the side of take-out pin 5 moving relative to pinch roller 4, which is for the purpose of recording video signal slantwise on the tape 24. The tapered roller 107, which is provided at the small arm 106 pivoted to arm 102 at pinch roller 4, abuts against a pin 116 formed at the terminus of loading as shown in FIGS. 5 and 12, small arm 106 turns the spring 109, and tapered roller 107 carrying the tape 24 allows the tape to escape outwardly, so that the tape 24 may not back-scrape against the tape guided toward rotary head 6 and heads 7, 8.

Figure 16:
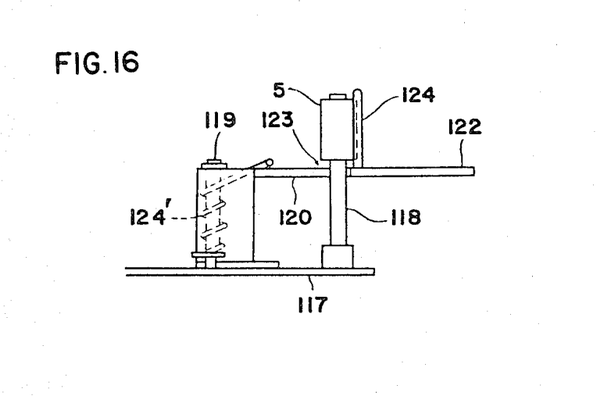
FIG. 16 is a fragmentary side elevation of the take-out pin.

The take-out pin 5, as shown in FIGS. 14 and 16, is pivoted onto the upper end of spindle 118 provided on an arm 117 extending from the second loading ring 13, and has a rocking plate 120 pivoted to a spindle 119 fixed to the arm 117. The rocking plate 120 is pivoted to arm 117 through the spindle 119 slightly shifted toward the ring 13 side with respect to the take-out pin, and is provided outwardly from the pin 5 with a tape pin 124. The plate 120 is shaped to surround the spindle 118 outwardly thereof and toward the tape pin 124 side through a curved portion 123, and has at the outer end a projection 122 abutting against a pin 121 formed at the position where the pin 121 is opposite to the pin 116 at the terminus of loading. Also, the plate 120 allows the curved portion 123 to always abut against the periphery of spindle 118 at the take-out pin 5. When the pin 5 moves until the loading terminus, the projection 122 at the utmost end of rocking plate 120 abuts against pin 121, so that the plate 120 turns against the spring 124', whereby the pin 124 carrying the tape 24 leaves the take-out pin 5, thus preventing the tape 24 from back-scrape against the tape guide toward the rotary head 6 and head 8.

Hence, the tape 24, as shown in FIG. 5, is drawn out of the reels 22 and 23 within the cassette 21 and loaded toward the tape reel 2 at take-up reel 3 from the tape reel 23 fitting to the feed reel 2 shaft successively through the pin 124, take-out pin 5, whole width erasing head 8, rotary head 6, voice erasing head 9, voice control head 7, between capstan 10 and pinch roller 4, pin 104, pinch roller 4, and tapered roller 107.

Figures 17, 18, 19:
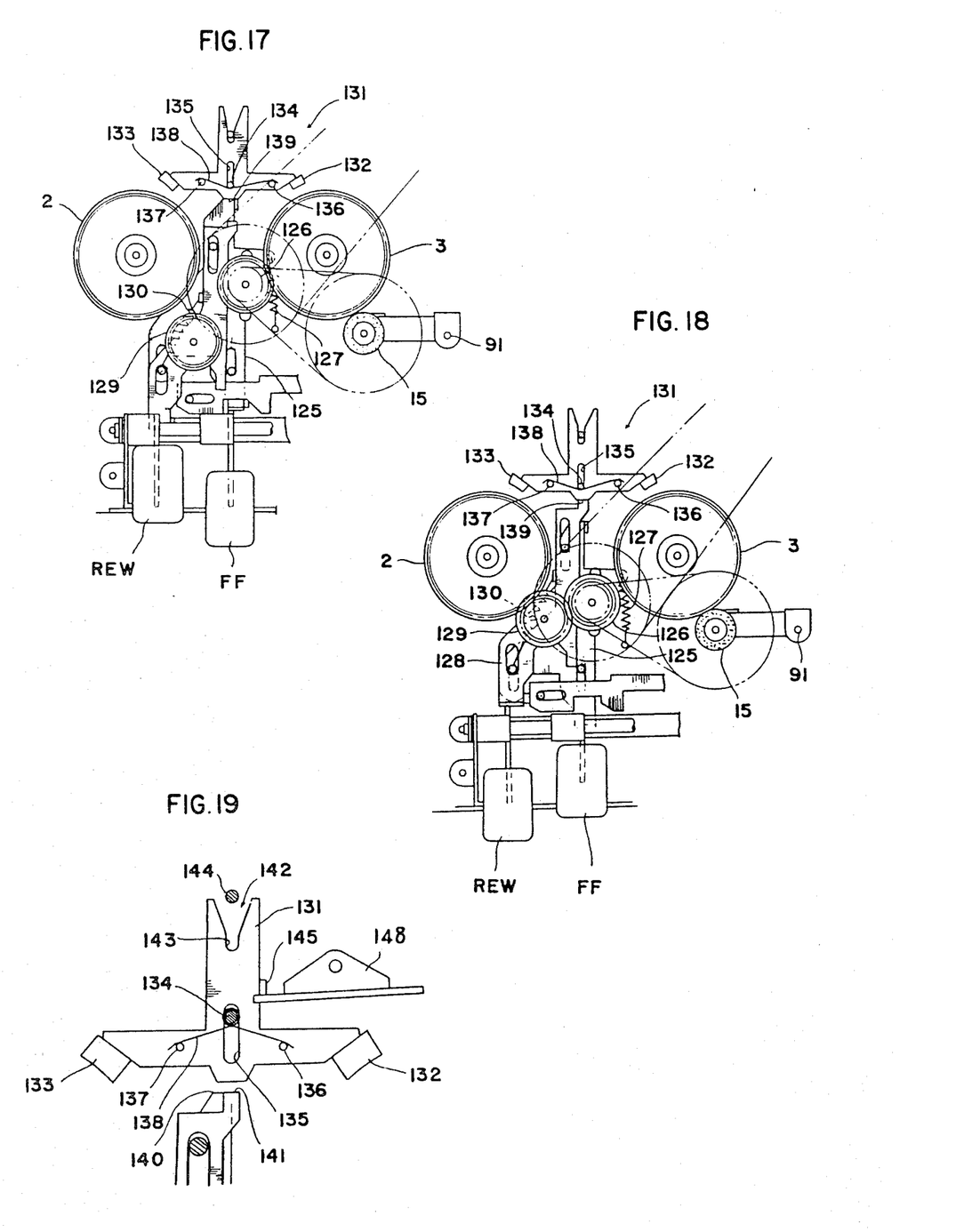
FIG. 17 is a fragmentary plan view of gear train for the tape reels when in fast forward position.
FIG. 18 shows the mechanism when in rewinding condition.
FIG. 19 is a detail of the braking mechanism.
Figure 20:
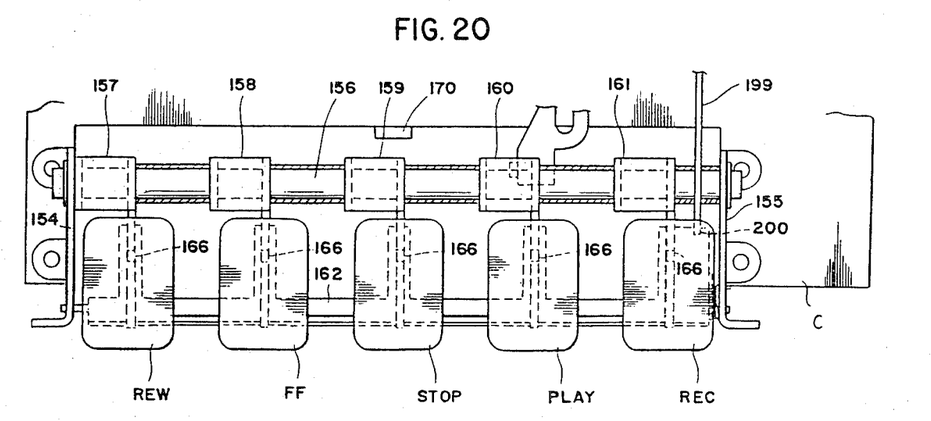
FIG. 20 is a plan view of the control buttons in neutral condition.

Next, tape fast forward and rewinding mechanism is shown in FIGS. 17 and 18. A fast forward button (FF) is operated to be self-locked. A fast forward transmitting gear 126, which is pivoted to a slide plate 125 between the pair of reels 2 and 3, engages with a gear formed at the outer periphery of take-up reel 3 as shown in FIG. 17, thereby rotating the take-up reel 3 in the winding-up direction through the gear 126 rotatable through a drive mechanism to be hereinafter described, the slide plate 125 being biased in the direction of restoration through a spring 127.

The rewind button (REW), when operated, is self-flocked, and a rewinding transmitting gear 129, which is pivoted to a slide plate 128 between the pair of reels 2 and 3, engages with a gear at the outer periphery of feed reel 2 and with the fast forward transmitting gear 126 as shown in FIG. 18, thereby transmitting to the feed reel 2 through the rewinding gear 126 the rotation of fast forward gear 126 rotatable through a drive mechanism to be hereinafter described, thus rotating the feed reel 2 in the rewinding direction, the slide plate 128 being biased in the return direction through a spring 130.

The fast forward transmitting gear 126 and rewinding transmitting gear 129 move between the pair of reels 2 and 3, the gear 126 being coupled with the take-up reel 3, the gear 129 being coupled with the gear 126 stationary and with the feed reel 2. Hence, pivot points of gears 126, 129 and locations of slide plates 125, 128 are set to carry out the above operations. The reels 2, 3 and gear 129 are made from synthetic resin and gear 126 is metallic, whereby the metallic gear 126 directly driven by the drive source is rotating to mesh with the gear of stationary reel 3 and gear 129 to thereby keep a good gear train. The gear 129 on the slide plate 125, when button (REW) is pushed, slightly moves against the spring 127, and simultaneously the gear 129 is coupled with the gear of reel 2, thereby improving the connection between the gears 126 and 129.

The slide plates 125, 128 associate at the tips thereof with a brake member 131, which is of T-like shape, has at both ends elastic members 132, 133 press-contacting with the smaller diameter portions 96, 96a of reels 2, 3 respectively, and is slidable in the operating direction through a slot 135 into which a pin 134 fixed to the chassis C is inserted. A spring 138 wound at its center onto the pin 134 is retained at both ends to pins 136, 137 projecting from the both ends of T-shaped member 131, thereby biasing the member 131 in the return direction (the braking direction). The top 139 of T-shaped member 131 abuts against the tips 140, 141 of slide plates 125, 128, so that when the slide plate 125 or 128 abuts against the top (when in fast forward or rewinding), the member 131 slides against the spring 138 to move the elastic members 132, 133 apart from the smaller diameter portions 96, 96a at reels 2, 3, thereby releasing the reels 2, 3 from braked conditions.

A diverging cutout 142 which terminates in a slot 143 are formed at a root of T-shaped member 131, so that a pin 144 at the chassis C may be properly switched between the diverging cutout 142 and the slot 143. In detail, an upturned lug 145 is provided at one side edge of member 131 and associates with the upturned lug 150 formed halfway of the elongate slide plate 86, through two rocking plates 148, 149 swingable around spindles 146, 147 respectively as shown in FIG. 13. Hence, during playback, video recording and unloading, the lug 150 at the slide plate 150 in an active condition, pushes the lug 145 at braking member 131 through the rocking plates 148, 149, whereby the member 131 rotates around the pin 134 in the arrow direction to contact the pin 144 with one wall at the cutout 142, of which time the elastic member 132 leaves the smaller diameter portion 96 and that 133 abuts against the smaller diameter portion 96a. Thus, while braking the reel 2, the reel 3 is released to be rotatable by the idler 15 to thereby wind-up the tape 24 in tension.

Furthermore, another brake member 151, as shown in FIG. 1, is provided for the reel 2, which is pivoted at its intermediate portion, is turnable at one end through a tongue 152 toward the arm 117 carrying the take-out pin 5 to thereby release the reel 2 from braking, and forms at the other end a tongue 153. The tongue 153 engages with one end of a cassette mounting case (a case pivoted to the chassis, housing the cassette, and opening-and closing on the cassette base 29) not shown, so that the brake member 151, when the unloading ends, turns to disengage the tongue 151 from the cassette mounting case to thereby keep the case openable. In other words, during loading, the member 151 is kept in the aforesaid engagement to lock the case closed.

Figure 21:
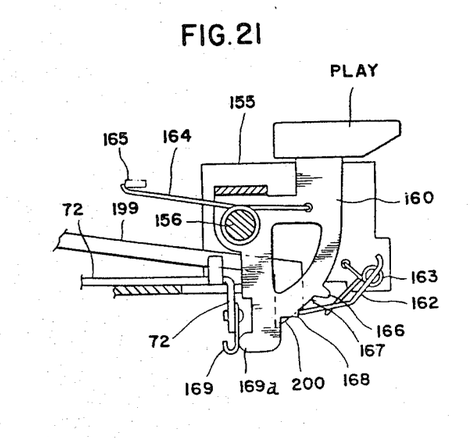
FIG. 21 is a sectional side view of FIG. 20.
Figure 22:
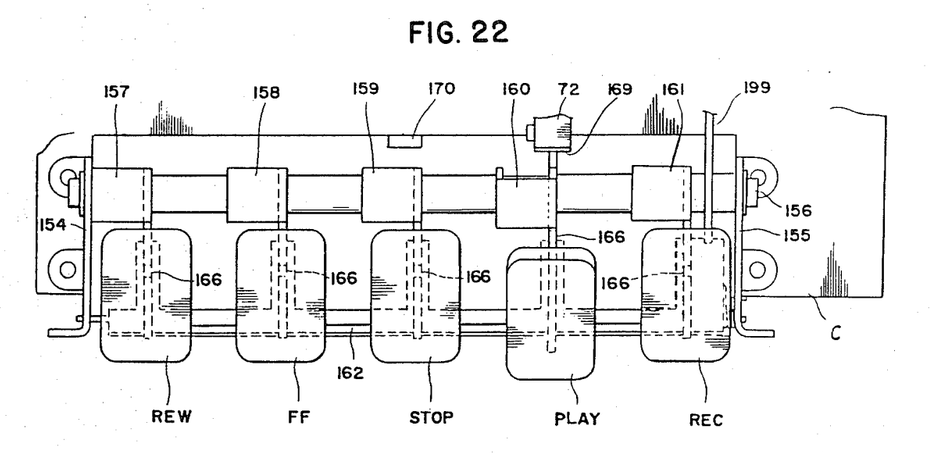
FIG. 22 shows the playback button in operating position.
Figure 23:
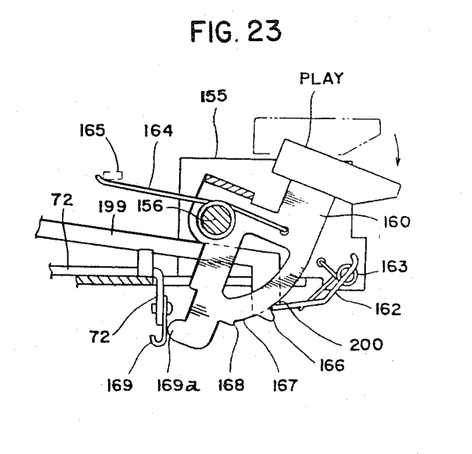
FIG. 23 is a sectional elevation of FIG. 22.

The group 1 of control buttons is of self-locking type, which will be described according to FIGS. 20 through 23. Bracket members 154, 155 are fixed on the chassis through screws. A single lever shaft 156 is horizontally mounted between the bracket members and pivotally supports at regular intervals operating levers 157, 158, 159, 160 and 161 for the rewinding button (REW), fast forward button (FF), stopping button (STOP), playback button (PLAY) and video recording button (REC). To the bracket members 154, 155 and pivoted retainers 162 each of L-shaped type as shown in FIG. 21, a partially sectional view of the playback button (PLAY). A spring 163 is wound onto the pivot position of the retainer 162 and is seated at one end on the bracket member 155 and engages at the other end with the lower surface of retainer 162, thereby always biasing the retainer 162 to be turnable clockwise. A spring 164 is wound onto the lever shaft 156 and engages at one end with the playback lever 160 and at the other end with a proper spring seat 165, thereby biasing the playback lever 160 always in the not-operating condition. The playback lever 160 and other levers 157, 158, 159 and 161, as shown in FIG. 21 have projections 166 integral with the levers respectively, so that when the respective levers 157 through 161 are active, the projection 166 abuts against the retainer 162 through a slide face 167 to keep each lever in operating condition, and when the levers are inactive, the retainer 162 engages at its tip with a stop 168 at the respective levers 157 through 161.

An actuator 169a is provided at the respective levers 157 through 161 and abuts against a leaf spring 169 provided at an operating end of each of the rewinding slide plate 128, rapid feed slide plate 125, playback slide plate 72 and video recording slide plate 73. When each of levers 157 to 161 is operated, the leaf spring 169 allows the respective slide plates 128, 125, 72 and 73 to slide and to be locked in operating condition. The reason for interposing these leaf springs 169 is to absorb a stroke difference because the actuator 169a is larger in stroke than the respective plates 128, 125, 72 and 73, thereby ensuring action of actuator 169a. In addition, the utmost end of lever 159 for stopping button (STOP) (the utmost end corresponding to the actuator 169a) abuts against a stopper 170 not to engage the tip of retainer 162 with a projection (corresponding to the projection 166) at the chassis C, whereby the stopping lever (STOP) only is not locked.

Figure 24:
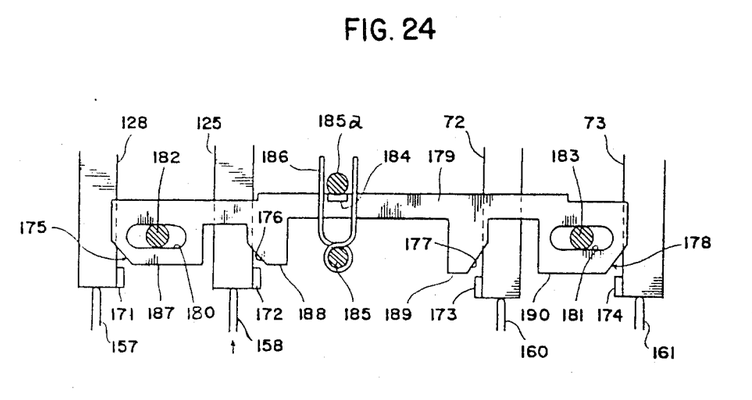
FIG. 24 is a fragmentary plan view of the locking mechanism for the control buttons when in neutral position.
Figure 25:
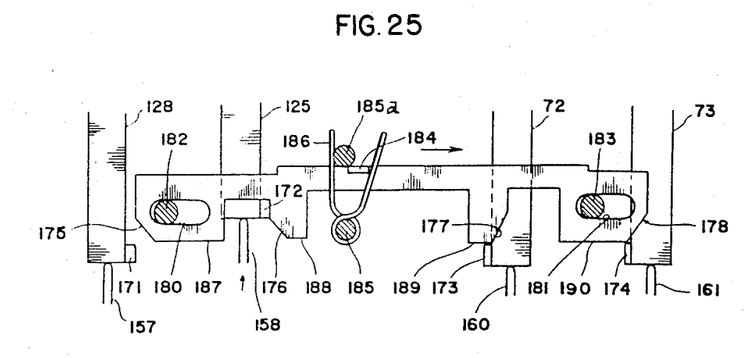
FIG. 25 shows the playback and record buttons in locked position.
Figure 26:
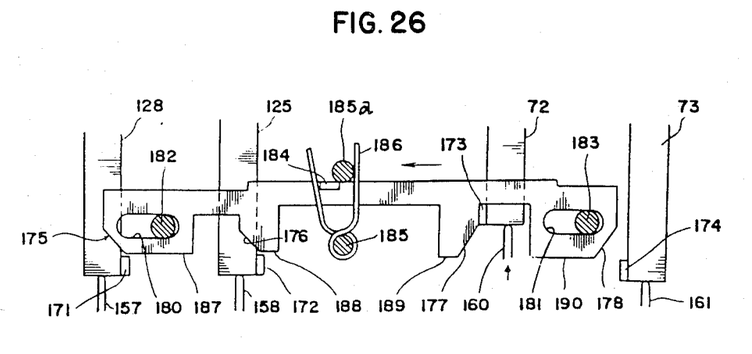
FIG. 26 shows the rewind and fast forward buttons in locked position.

When the playback slide plate 72 or video recording slide plate 73, is in operating condition, the rewinding slide plate 128 and fast forward slide plate 125, i.e., rewinding button (REW) and fast forward button (FF), are locked not to operate. Conversely, when the plate 128 or 125 is in operating condition, other slide plates 72, 73, i.e., playback button (PLAY) and video recording button (REC), are locked not to operate. In detail, projections 171, 172, 173 and 174, as shown in FIG. 24, are provided from the respective plates 128, 125, 72 and 73 at its side of operating the respective levers 157, 158, 160, 161. While, a lock plate 179 having tapered faces 175, 176, 177 and 178 abutting against the projections 171 to 174 respectively is provided to be slidable through elongate slots 180, 181 and pins 182, 183 on the chassis in the direction of intercrossing the sliding direction of the respective levers 157, 158, 160 and 161. Also, the lock plate 179 has at its central portion a projection 184 which keeps the plate 179 neutral and is positioned together with another pin 185a on the chassis within a U-shaped spring 186 wound onto a pin 185. Referring to FIG. 25, for example, when the playback button (PLAY) actuates the lever 160, the projection 173 at slide plate 72 abuts against the tapered face 177 of lock plate 179 to move the plate 179 leftwards and bias it in the return direction through a spring 186. The video recording button (REC) is the same as the above. At this time, the projections 171, 172 abut against the stop faces 187, 188 to restrain the levers 157, 158 from moving in the operating directions respectively. On the contrary, when the rapid feed button (FF) actuates the lever 158, the projection 172 at slide plate 125 abuts against the tapered face 176 at the lock plate 179 to thereby move the plate 179 rightwards and bias it in the return direction through the spring 186. At this time, the projections 173, 174 abut against the stop faces 189, 190 at lock plate 179 to thereby restrain the levers 160, 161 from moving in the operating directions respectively.

Furthermore, the feed reel 2, take-up reel 3 and capstan 10, as shown by the phantom line in FIG. 1, are driven in such a manner that one pulley 191 is coupled with the flywheel 11 through a belt 193, the other pulley 192 is coupled with a pulley 195 at the fast forward gear 16 through a belt 194, and another pulley 196 at the gear 16 is coupled with a pulley 198 through a belt 197.

Furthermore, the automatic stopping mechanism actuates the plunger 20 to turn on through electric elements (not shown) for detecting the finish of unloading. The plunger 20, as shown in FIGS. 20 through 23, engages an actuating arm 199 at its hook 200 with the foremost end of L-shaped retainer 162 at the video recording button (REC) side thereof, so that the plunger 20 is actuated to turn the retainer 162 against the spring 163 to thereby disengage the retainer 162 from the projection 166 at the lever, 157, 158, 160 or 161 or any button in operation.

Furthermore, the capstan 10 and group of heads 7, 8 and 9, are set opposite to the pair of reels 2, 3 sandwiching the rotary head 6. Especially, in this embodiment, the axis of captan 10, the axis 201 of rotary head 6, and the center between the pair of reels 2, 3, are aligned. The first loading gear ring 12 and second loading gear ring 13 are aligned at the axes thereof on the above straight line. Hence, the pinch roller 4 and take-out pin 5 are relatively loaded or unloaded to or from the capstan 10 and heads 7, 8 and 9 in the vicinity of the rotary head 6, thereby drawing out the tape with little resistance. Consequently, the mechanism necessary for loading is designed with ease and the tape cassette of small size is adopted to make the whole mechanism simple and compact.

As clearly understood from the aforesaid description, the video tape recorder of the invention has the capstan, voice control head and erasing head, disposed opposite to the feed reel and take-up reel sandwiching the rotary head, and the first loading gear ring providing the pinch roller press-contacting with the capstan and drawing the tape out of the cassette toward one side of the rotary head and the second loading gear ring having the take-out pin for drawing the tape out of the cassette toward the other side of the rotary head, are disposed to surround in the vicinity of the rotary head interposed between the reel arranging position and the capstan, so that the two rings may rotate opposite to each other to draw the tape out of the cassette through the pinch roller and take-out pin, thereby loading the tape nearly at random, onto the rotary head, voice control head, erasing head and capstan. Hence, the mechanism for loading the tape onto the rotary head and capstan or the like is able to be simple and compact in construction to thereby ensure attachment of the tape onto the rotary head, voice control head, erasing head and capstan. Also, the capstan, rotary head, feed reel and take-up reel, are positioned with ease onto the chassis to simplify the design and assembly of tape recorder. Furthermore, the tape loading at random is advantageous in that the tape is simply carried and drawn out to a small extent, thereby smoothly running the tape.

I claim:

1. A videotape tape cassette recorder device of the type wherein magnetic tape is stored in a cassette containing a supply spool and a take-up spool disposed side-by-side on spaced parallel axes, the tape being withdrawn from the cassette by loading means for operative engagement with rotary video transducing means, the combination comprising:
   audio transducer head means and erasing head means fixedly mounted for operative engagement with said magnetic tape when withdrawn from said cassette;
   capstan means for driving said tape when withdrawn from said cassette;
   said rotary video transducing head means being rotatable about an axis parallel with the axes of said spools and disposed generally between said spools and the group comprising the audio transducing head means and erasing head means;
   said loading means comprising pinch roller means and take-out pin means;
   and means to move said pinch roller means and take-out pin means in respective arcuate paths in opposite directions from an unloaded position within a cassette to a loaded position to withdraw tape from the cassette and wrap a portion of tape around a portion of the circumference of the video transducer head means in a helical path and into said operative engagement with the audio transducer head means, erasing head means and capstan means.

2. The device defined in claim 1, wherein said loading means includes a pair of ring-shaped elements mounted for rotation about respective axes parallel with axes of said spools, said pinch roller being mounted on one of the ring-shaped elements for axial translatory movement during loading and unloading and the take-out pin means being mounted on the other of the ring-shaped elements for movement in the plane of the spools during loading and unloading.

3. The device defined in claim 2, wherein the pinch roller means and take-out pin means comprise tape withdrawal members and are disposed away from the cassette beyond the far side of the rotary video transducer head means when in their loaded positions whereby the tape moves toward and away from the roller means and pin means in each case in two oppositely moving elongated paths, and tape guide means is provided to prevent surface contact between oppositely moving tape.

4. The device defined in claim 3, wherein said tape guide means comprises a vertical member mounted on a pivoted arm disposed inwardly in unloaded position and movable outwardly when in loaded position to carry tape in one of said two paths out of contact with tape in the other path.

5. The device defined in claim 4, wherein said tape guide means includes biassing means urging it inwardly, and stop means is provided to abut against said pivoted arm to move it outwardly at the loaded position.

6. The device defined in claim 4, wherein said vertical member comprises an inverted tapered roller.

7. The device defined in claim 6, wherein said pivoted arm includes means biassing said arm toward outward movement.

8. The device defined in claim 7, wherein circular guide means is provided outwardly of the arm carrying said tapered roller to prevent outward movement of the roller except adjacent the loaded position.

9. The device defined in any one of claims 3, 4, 5, 6, 7 or 8, wherein both of said tape withdrawal members include a vertical member mounted on a pivoted arm disposed inwardly in unloaded position and movable outwardly when approaching the loaded position, and stop pins to hold the arms outwardly.

10. A tape cassette recorder device of the type wherein magnetic tape is stored in a cassette containing a supply spool and a take-up spool disposed side-by-side on parallel axes, the tape being withdrawn from the cassette by loading means for operative engagement with rotary video transducing-head means, erasing head means and capstan tape driving means when withdrawn from said cassette, the combination comprising:
    said loading means including a pair of ring-shaped elements mounted for rotation about axes parallel with the axes of said spools;
    said video transducing head means being rotatable about an axis parallel with axes of said spools;
    electric motor means rotating in one direction and gear train means including shiftable reversing gear means connecting the motor means to drive said ring-shaped elements simultaneously in opposite directions;
    pinch roller means and take-out pin means mounted respectively on each of the pair of ring-shaped elements for translatory movement in respective arcuate paths in opposite directions from an unloaded position to a loaded position to withdraw tape from the cassette and wrap a portion of tape around a portion of the circumference of the video transducing head means in a helical path and into said operative engagement with the audio transducer head means, erasing head means and capstan means.

11. The device defined in claim 10, wherein said shiftable reversing gear means includes a neutral position, and also includes means engageable with a ring-shaped element to shift said gear means to said neutral position when loading or unloading of the tape is completed.

12. The device defined in claim 11, wherein said reversing gear means includes a first gear rotated in one direction by said motor means and a pair of gears selectively engageable with the first gear to move the ring-shaped elements respectively in loading and unloading directions.

13. The device defined in claim 12, wherein said reversing gear means includes pivotally mounted lever means for shifting the positions of said pair of gears, and means on one of said ring-shaped elements engageable with said level means to shift the pair of gears to neutral position at one of the loaded or unloaded positions.

14. The device defined in claim 13, wherein said lever means is provided with a member engageable with the peripheral surface of said ring-shaped element, said surface having a recessed portion which receives said member to shift said gears.

15. The device defined in claim 14, wherein said lever means includes a pair of rocking plates each provided with a roller engaging said peripheral surface, said surface being provided with a pair of recesses to respectively receive one of the rollers to selectively shift said pair of gears.

16. In a video tape recorder device for use with magnetic tape stored in a cassette having supply and take-up reels therein, the device including a video transducer head means provided with a housing having a cylindrical exterior surface with a magnetic transducer revolving thereon on a concentric axis and loading means movable between an unloaded position within a cassette and a loaded position for transferring a portion of tape between a stored condition in a cassette and an operative condition wrapped partially around said surface in a helical track, the combination comprising:

said cylindrical exterior surface being provided with a radially projecting guide surface for guiding tape along said helical track at least partially around the circumference of the housing;

said loading means including pinch roller means movable between an unloaded position in a cassette and a loaded position in engagement with tape driving means;

said loading means also including an element rotatable about an axis parallel with the axis of the video transducer head means, and;

means to mount said pinch roller means on said rotatable element for translatory motion in a generally helical path adjacent at least a portion of said guide surface during at least a portion of said movement between unloaded and loaded positions to wrap said portion of tape along said helical track.

17. The device defined in claim 16, wherein said loading means also includes electric motor means including drive means connecting the motor means with the loading means to move the pinch roller means between said unloaded and loaded positions, and automatic stop means operative when motion of said pinch roller means has been initiated to stop said motion when a respective position has been reached.

18. The device defined in claim 17, wherein said loading means includes a supporting element rotable about an axis parallel with the axis of said cylindrical surface, said pinch roller means being mounted on said element for translatory motion in a direction parallel with said axes, and guide plate means inclined at the angle of said guide surface for sliding engagement with the pinch roller means to guide said last-named translatory motion.

19. The device defined in claim 18, wherein said loading means includes an arcuate guide plate means, and said pinch roll means is also pivotally mounted on said supporting element for sliding engagement with said arcuate guide plate for movement in said helical path.

20. The device defined in claim 19, wherein said supporting element includes a ring-shaped member and said drive means includes gear train means having reversing gear means connected between the electric motor means and supporting element.

21. Control system for magnetic tape recorder devices of the type wherein a first pair of buttons are selectively movable to actuate rewinding and fast forward movement respectively of a tape, a second pair of buttons are selectively movable to actuate playback and recording movement of said tape and a stop button is movable to stop movement of said tape, all of said buttons being rotatable about a common axis between inactive and active positions, the combination comprising:

a locking slide plate mounted for sliding movement axially of said common axis, between first and second positions;

means to resiliently urge said locking plate toward a neutral position intermediate said first and second positions;

camming means engageable between said first pair of buttons and the locking plate to move the locking plate to the first position and hold the plate at that position; when one of the first pair of buttons is moved to the active position;

camming means engageable between said second pair of buttons and the locking plate to move the locking plate to the second position and hold the plate at that position when one of the second pair of buttons is moved to the active position;

stop means for each of the first and second pair of buttons to prevent movement of the first pair of buttons from an inactive position when one of the second buttons is in the active position and to prevent movement of the second pair of buttons from an inactive position when one of the first pair of buttons is in the active position, and;

each of said stop means comprising a surface provided on the locking plate to be positioned in abutting relationship to a complementary surface on a button to prevent said movement from an inactive position.

22. The system defined in claim 21, wherein said means to resiliently urge said locking plate toward a neutral position comprises a pair of fixed elements mounted on opposite sides of said locking plate, springs means mounted on one of said elements having two spaced resilient arms extending across the locking plate and on respective opposite sides of the other of the fixed elements, and a projection on said locking plate to abut against alternate ones of the resilient arms when moved to the respective first and second positions.

* * * * *